US012102032B2

(12) United States Patent
Wilhelmi et al.

(10) Patent No.: US 12,102,032 B2
(45) Date of Patent: Oct. 1, 2024

(54) MOUNT FOR AGRICULTURAL IMPLEMENT

(71) Applicant: Kinze Manufacturing, Inc., Williamsburg, IA (US)

(72) Inventors: Matthew Wilhelmi, Williamsburg, IA (US); Dean Martin, Williamsburg, IA (US); David A. Stauffer, Williamsburg, IA (US); Chris McElvain, Williamsburg, IA (US); Gary Newell, Williamsburg, IA (US); Dalton McDowell, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 932 days.

(21) Appl. No.: 17/248,089

(22) Filed: Jan. 8, 2021

(65) Prior Publication Data
US 2021/0212252 A1      Jul. 15, 2021

Related U.S. Application Data

(60) Provisional application No. 62/959,044, filed on Jan. 9, 2020.

(51) Int. Cl.
*A01C 7/20*  (2006.01)
*A01C 7/04*  (2006.01)

(52) U.S. Cl.
CPC ............. *A01C 7/201* (2013.01); *A01C 7/046* (2013.01)

(58) Field of Classification Search
CPC ........... A01C 7/201; A01C 7/046; A01C 7/20; A01C 7/00; A01C 7/044; A01C 7/042; A01C 7/04
See application file for complete search history.

(56) References Cited

U.S. PATENT DOCUMENTS

| | | | |
|---|---|---|---|
| 2,566,406 A | 9/1951 | Dougherty | |
| 2,960,258 A | 11/1960 | Dodwell | |
| 3,176,636 A | 4/1965 | Wilcox et al. | |
| 4,023,509 A | 5/1977 | Hanson | |
| 4,029,235 A | 6/1977 | Grataloup | |
| 4,162,744 A | 7/1979 | Barker et al. | |

(Continued)

FOREIGN PATENT DOCUMENTS

| | | |
|---|---|---|
| RU | 2529317 C2 | 9/2014 |
| WO | 2014066643 A2 | 5/2014 |

OTHER PUBLICATIONS

International Searching Authority in connection with PCT/US2021/012580 filed Jan. 8, 2021, "The International Search Report and The Written Opinion of the International Searching Authority, or the Declaration", 20 pages, mailed Jun. 28, 2021.

(Continued)

*Primary Examiner* — Christopher J. Novosad
(74) *Attorney, Agent, or Firm* — McKee, Voorhees & Sease, PLC

(57) ABSTRACT

A row unit for an agricultural implement has a mounting device with a rail portion for sliding engagement with a seed delivery device to facilitate quick and easy installation and removal of the seed delivery device without the use of tools. A seed meter is mounted to the underside of a cover such that as the cover is opened the seed meter moves with the cover away from the seed delivery device to provide convenient access to both the seed meter and the seed delivery device. A cam and pawl arrangement selectively retains the cover in the open position.

18 Claims, 17 Drawing Sheets

(56) References Cited

U.S. PATENT DOCUMENTS

| | | | |
|---|---|---|---|
| 4,664,290 | A | 5/1987 | Martin et al. |
| 6,651,570 | B1 | 11/2003 | Thiemke |
| 6,681,706 | B2 | 1/2004 | Sauder et al. |
| 7,185,596 | B2 | 3/2007 | Thiemke et al. |
| 7,343,868 | B2 | 3/2008 | Stephens et al. |
| 7,631,606 | B2 | 12/2009 | Sauder et al. |
| 8,074,586 | B2 | 12/2011 | Garner et al. |
| 8,468,960 | B2 | 6/2013 | Garner et al. |
| 8,543,238 | B2 | 9/2013 | Straeter |
| 8,746,159 | B2 | 6/2014 | Garner et al. |
| 8,789,482 | B2 | 7/2014 | Garner et al. |
| 8,800,457 | B2 | 8/2014 | Garner et al. |
| 8,813,663 | B2 | 8/2014 | Garner et al. |
| 8,850,995 | B2 | 10/2014 | Garner et al. |
| 8,850,998 | B2 | 10/2014 | Garner et al. |
| 8,985,037 | B2 | 3/2015 | Radtke et al. |
| 9,332,689 | B2 | 5/2016 | Baurer et al. |
| 9,480,199 | B2 | 11/2016 | Garner et al. |
| 9,510,502 | B2 | 12/2016 | Garner et al. |
| 9,578,802 | B2 | 2/2017 | Radtke et al. |
| 9,633,491 | B2 | 4/2017 | Wonderlich |
| 9,635,802 | B2 | 5/2017 | Rains et al. |
| 9,635,804 | B2 | 5/2017 | Carr et al. |
| 9,661,799 | B2 | 5/2017 | Garner et al. |
| 9,686,905 | B2 | 6/2017 | Garner et al. |
| 9,686,906 | B2 | 6/2017 | Garner et al. |
| 9,699,955 | B2 | 7/2017 | Garner et al. |
| 9,750,178 | B2 | 9/2017 | Kinzenbaw et al. |
| 9,756,779 | B2 | 9/2017 | Wilhelmi et al. |
| 9,769,978 | B2 | 9/2017 | Radtke |
| 9,801,328 | B2 | 10/2017 | Garner et al. |
| 9,807,924 | B2 | 11/2017 | Garner et al. |
| 9,820,429 | B2 | 11/2017 | Garner et al. |
| 9,861,025 | B2 | 1/2018 | Schaefer et al. |
| 9,861,031 | B2 | 1/2018 | Garner et al. |
| 9,872,424 | B2 | 1/2018 | Baurer et al. |
| 9,883,625 | B2 | 2/2018 | Koch et al. |
| 9,897,922 | B2 | 2/2018 | Enomoto et al. |
| 9,936,625 | B2 | 4/2018 | Wendte et al. |
| 9,949,426 | B2 | 4/2018 | Radtke et al. |
| 9,999,175 | B2 | 6/2018 | Baurer et al. |
| 2012/0067261 | A1 | 3/2012 | Garner et al. |
| 2013/0192504 | A1 | 8/2013 | Sauder et al. |
| 2016/0128273 | A1 | 5/2016 | Garner et al. |
| 2016/0135363 | A1 | 5/2016 | Sauder et al. |
| 2016/0234996 | A1 | 8/2016 | Sauder et al. |
| 2016/0255770 | A1 | 9/2016 | Levy |
| 2017/0127604 | A1 | 5/2017 | Wilhelmi et al. |
| 2017/0215333 | A1 | 8/2017 | Johnson et al. |
| 2017/0332546 | A1 | 11/2017 | Garner et al. |
| 2017/0359949 | A1 | 12/2017 | Garner et al. |
| 2018/0007824 | A1 | 1/2018 | Radtke |

OTHER PUBLICATIONS

Kinze Manufacturing, Inc., PCT/US2018/053479 filed Septemeber 28, 2018, "The International Search Report and the Written Opinion of the International Searching Authority, or the Declaration", 17 pages, mailed Nov. 30, 2018.

MOUNT FOR AGRICULTURAL IMPLEMENT

CROSS-REFERENCE TO RELATED APPLICATIONS

This application claims priority under 35 U.S.C. § 119 to provisional patent application U.S. Ser. No. 62/959,044, filed Jan. 9, 2020. The provisional patent application is herein incorporated by reference in its entirety, including without limitation, the specification, claims, and abstract, as well as any figures, tables, appendices, or drawings thereof.

FIELD OF THE INVENTION

The present invention relates generally to agricultural implements. More particularly, but not exclusively, the invention relates to a mechanism for mounting a seed delivery device in a row unit of an agricultural implement.

BACKGROUND OF THE INVENTION

An agricultural row crop planter is a machine built for distributing seed into the ground. The row crop planter generally includes a horizontal toolbar fixed to a hitch assembly for towing behind a tractor. Row units are mounted to the toolbar. In different configurations, seed may be stored at individual hoppers on each row unit, or it may be maintained in a central hopper and delivered to the row units on an as needed basis. The row units include groundworking tools for opening and closing a seed furrow, a seed metering system for providing seed at a desired rate, and a seed delivery device for delivering seed from the seed meter to the seed furrow.

The seed delivery device has traditionally been a gravity tube. More recently high-speed delivery devices include moving parts such as flighted conveyors (as shown in pending United States Patent Publication No. 20190098828 and issued U.S. Pat. No. 8,985,037) or brush belts (as shown in U.S. Pat. No. 8,813,663) (all three of which are hereby incorporated in their entireties). In any event, as used in this disclosure the term seed delivery device will refer to a portion of a row unit that moves or guides seed from a seed meter to the seed furrow.

Occasionally, for maintenance, repair, or replacement it is necessary, or at least desirable, to access a seed delivery device. This is especially so with respect the high speed and precision seed delivery devices that utilize moving parts. Typically, these delivery devices have been mounted to the row units with bolts or similar hardware that requires tools for installation and removal of the delivery devices. Furthermore, the mounting locations are often difficult or inconvenient to access.

Therefore, there is a need in the art for an agricultural planting implement that includes a mechanism that permits easier access to the seed delivery device. There is a corresponding need for a mechanism that allows quick and easy removal and reinstallation of the seed delivery device.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

Therefore, it is a principal object, feature, and/or advantage of the disclosed features to overcome the deficiencies in the art.

It is another object, feature, or advantage of the disclosed features to provide an agricultural planter with improved access to the seed delivery device.

It is another object feature, or advantage of the disclosed features to provide a mechanism that allows quick and easy removal and reinstallation of the seed delivery device.

It is a further object, feature, or advantage of the disclosed features to provide a mounting structure that permits quick and easy exchanging of seed delivery devices to permit the same row unit to utilize different types or styles of seed delivery devices. These and/or other objects, features, and advantages of the disclosure will be apparent to those skilled in the art. The present invention is not to be limited to or by these objects, features and advantages. No single embodiment needs to provide each and every object, feature, or advantage.

The disclosure, among other things, relates to a row unit for use with an agricultural implement that has a frame and a mounting member device attached to the frame. The mounting device has a rail portion. A seed delivery device has a feature adapted to slidingly engage the rail portion such that the rail portion guides the seed delivery device into an operable position. The row unit may include a spring in contact with the mounting device and the seed delivery device to urge the seed delivery device towards a seed meter. The spring may be a torsion spring secured to the mounting device. The spring may have a leg and the seed delivery device may have a peg that contacts the leg to thereby be urged towards the seed meter. The spring may include a loop that contacts a portion of the seed delivery device to urge the seed delivery device towards the seed meter. The rail portion may include a pocket formed by first and second flanges. The pocket may be relatively wide at a receiving end to funnel the protrusion between the flanges. The unit may further include a cover rotatably mounted to the frame that is adjustable between a closed position wherein the cover is generally covering the seed delivery device and an open position wherein the cover is partially withdrawn to expose the seed delivery device. A seed meter may be secured to an underside of the cover such that when the cover is moved to the open position, the seed meter is withdrawn from the seed delivery device to provide access to both the seed delivery device and the seed meter. A seed tube may extend through the cover to provide seed from a remote hopper to the seed meter. The seed tube may include an upper portion that is pivotally mounted relative to a lower portion of the seed tube such that as the cover is rotated between the closed and open positions that seed tube does not need to be disconnected from a supply tube.

According to additional described features a mounting device for use in mounting a seed delivery device to an agricultural row unit has an elongated body adapted for securement to the row unit. The mounting device has a rail portion on the body with a surface adapted for sliding engagement with a protrusion on a seed delivery device to guide the seed delivery device into an operable position. The rail portion may have a pocket formed by aligned flanges on the body. The rail portion may have two pockets formed on opposite sides of the body by a pair of transverse flanges. The pocket may be wider at an entrance to funnel the protrusion into the pocket. The elongated body may include an open notch at a lower end for receiving a frame member of the row unit. The mounting member may also include a U-shaped guide secured to the body to guide a seed delivery device into proper alignment with the mounting device such that the protrusion on the seed delivery device is received by the rail portion. A spring may be adapted to urge the seed delivery device towards a seed meter. The spring may be a torsion spring that wraps around a spindle on the body.

According to further described features a row unit for an agricultural implement has a frame and a cover pivotally mounted to the frame for movement between a closed position and an open position. A seed meter is secured to an underside of the cover. A seed delivery device is adapted to receive seed from the seed meter and deliver it to a furrow; whereby when the cover is in the closed position it covers and protects the seed meter and the seed delivery device and when the cover is in the open position the seed meter is moved away from the seed delivery device to provide a user access to the seed meter and the seed delivery device. A cam member with a notch may be mounted to the frame. A pawl may be pivotally mounted to the cover, whereby when the cover is adjusted to the open position the pawl drops into the notch to retain the cover in a raised open position. A seed tube may extend through the cover to provide seed from a remote hopper to the seed meter. The seed tube may include an upper portion that is pivotally mounted relative to a lower portion of the seed tube such that as the cover is rotated between the closed and open positions that seed tube does not need to be disconnected from a supply tube.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the invention.

DETAILED DESCRIPTION OF THE EMBODIMENTS

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Glossary

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

Figure 1:
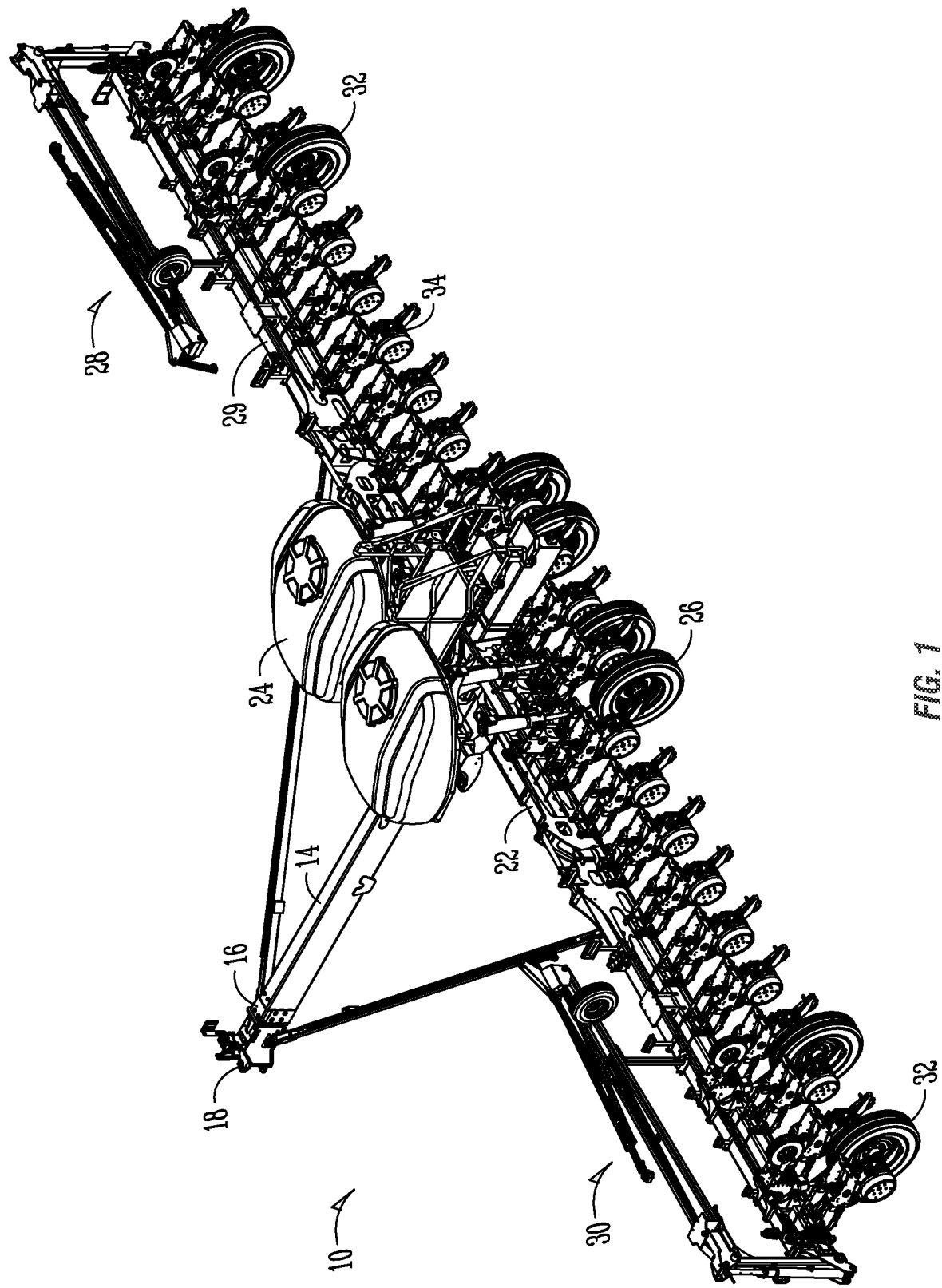
FIG. 1 is an isometric view of a planting implement include row units.

FIG. 1 shows an agricultural implement 10, in this case, an agricultural planter. The planter 10 is usually attached to and pulled by a tractor. However, it should be appreciated that other equipment and/or vehicles may move the implement 10. For purposes of the present disclosure, the implement 10 will be referred to as a planter.

The planter 10 includes a tongue 14 having a first end 16 and an opposite second end (not shown). The tongue 14 includes a hitch 18 at the first end 16, with the hitch 18 being connected to the tractor. At the opposite end of the tongue 14 is a central tool bar 22. The tongue 14 may be a telescoping tongue with components capable of being inserted into one another such that the implement 10 is a front folding style implement. However, the present invention is not to be limited to such front folding style implements and is to include any such implement for use in the agricultural industry.

Figure 3:
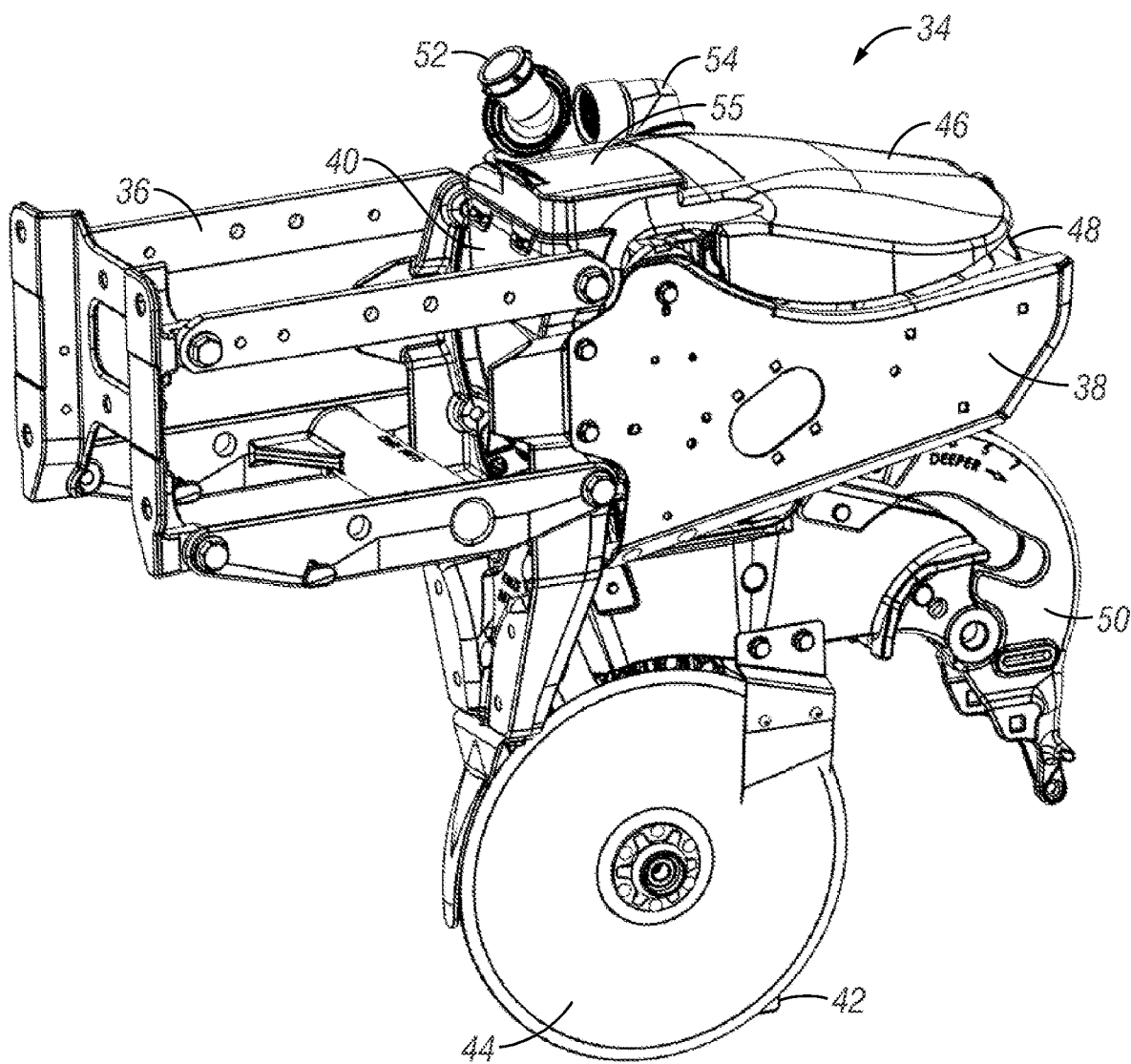
FIG. 3 is an isometric view of the row unit of FIG. 2.

As shown in FIG. 1, central hoppers 24 are positioned at the central toolbar 22. The hoppers 24 are configured to store seed, fertilizer, insecticide, or other types of material for use in farming. The hoppers 24 may both contain the same material or could contain separate materials. The use of the central hoppers 24 allows for a large amount of material to be added and stored at a centralized location. However, the invention also contemplates the use of one or more hoppers positioned at each of the row units 34 for providing seed to be planted at the row units, as is shown in FIG. 3. When central hoppers 24 are used at the central toolbar 22, it should be appreciated that the central hoppers will be in fluid communication with each of the row units 34. This can be done by use of separate hoses to each of the row units, or fewer hoses that include splitters, wherein the hose is split to provide seed or other material to more than one row unit. Also connected to the central toolbar is a plurality of central wheels, which may be known as transport wheels 26 extending generally downwardly from the central toolbar 22. The wheels 26 contact the ground and support the central hoppers 24. The wheels stabilize the implement 10 and are the wheels that contact the ground when in a working position or a transport position, e.g., if the implement 10 is a front folding implement such that the wings 28, 30 are folded forward with wing wheels 32 not contacting the ground.

Extending generally from both sides of the toolbar 22 are first and second wings 28, 30. The wings 28, 30 are generally identical and mirror images of one another. Therefore, only one wing will be described with the understanding that the other wing will be generally the same configuration. The first wing 28 includes a bar 29. Mounted to the bar 29 are a plurality of row units 34, as well as a plurality of wheels 32. The wheels 32 are configured to contact the ground. The row units 34 may be seeders, fertilizers, insecticide sprayers, or other dispensers, discs, or plows. The wings 28, 30 may also include at least one fold cylinder and a down force cylinder. It is further contemplated that multiple down force cylinders be used with an implement having more sections. The fold cylinder(s) is configured to fold the wings to a position wherein the first and second wings 28, 30 are generally adjacent the tongue 14 of the implement 10.

Figure 2:
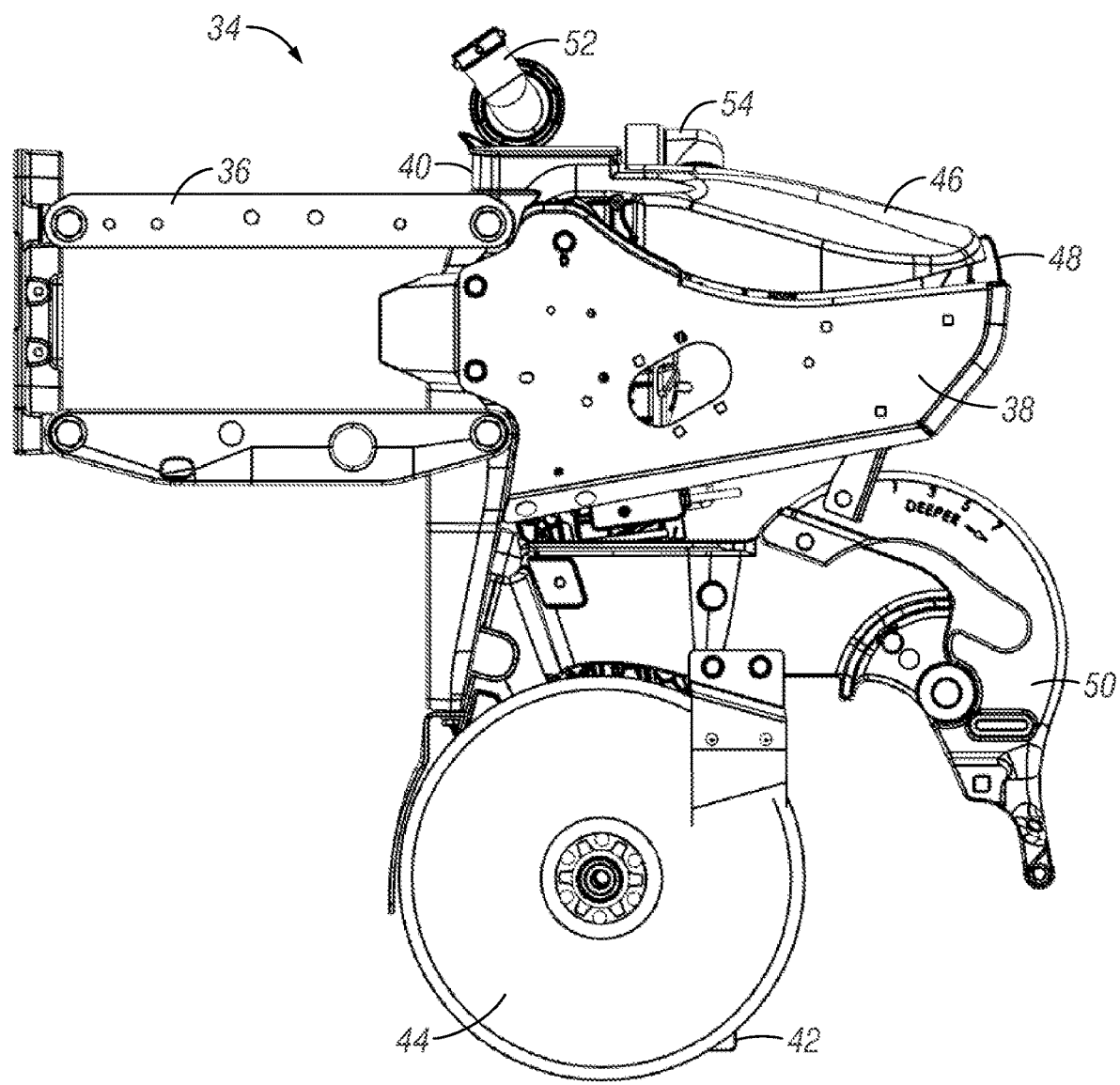
FIG. 2 is a side elevation view of a row unit according to the present disclosure with its gauge wheels and furrow closer removed for clarity.

FIGS. 2 and 3 show a row unit 34 with its gauge wheels and furrow closer removed for clarity. The row unit 34 includes a linkage 36 for attachment to the bar 29 (see FIG. 1). The linkage 36 attaches to a row unit frame 38. The frame 38 includes structure that supports a seeder unit 40. The seeder unit 40 includes a seed meter (not visible in FIGS. 2 and 3) and a seed delivery device 42 (just visible below the furrow opening disk 44 in FIGS. 2 & 3). The seeder unit 40 also includes a cover 46 retained in the closed position of FIGS. 2 & 3 by a latch 48. The depth of the furrow opening disk 42 is adjustable via the gauge wheel adjuster 50. Seeds may be provided to the seeder unit 40 via seed tube 52 that may be connected to a central hopper 24 (see FIG. 1) containing a supply of seeds. A pneumatic tube 54 also extends through the cover 46 to provide vacuum to the seed meter. The cover 46 has a sliding lid 55 that permits access to the seed compartment of the seeder unit to permit manual filling of seed. According to one embodiment the lid 55 is removable from the cover 46 but has an attached tether that retains it to the cover 46 so that it does not get lost.

Figure 4:
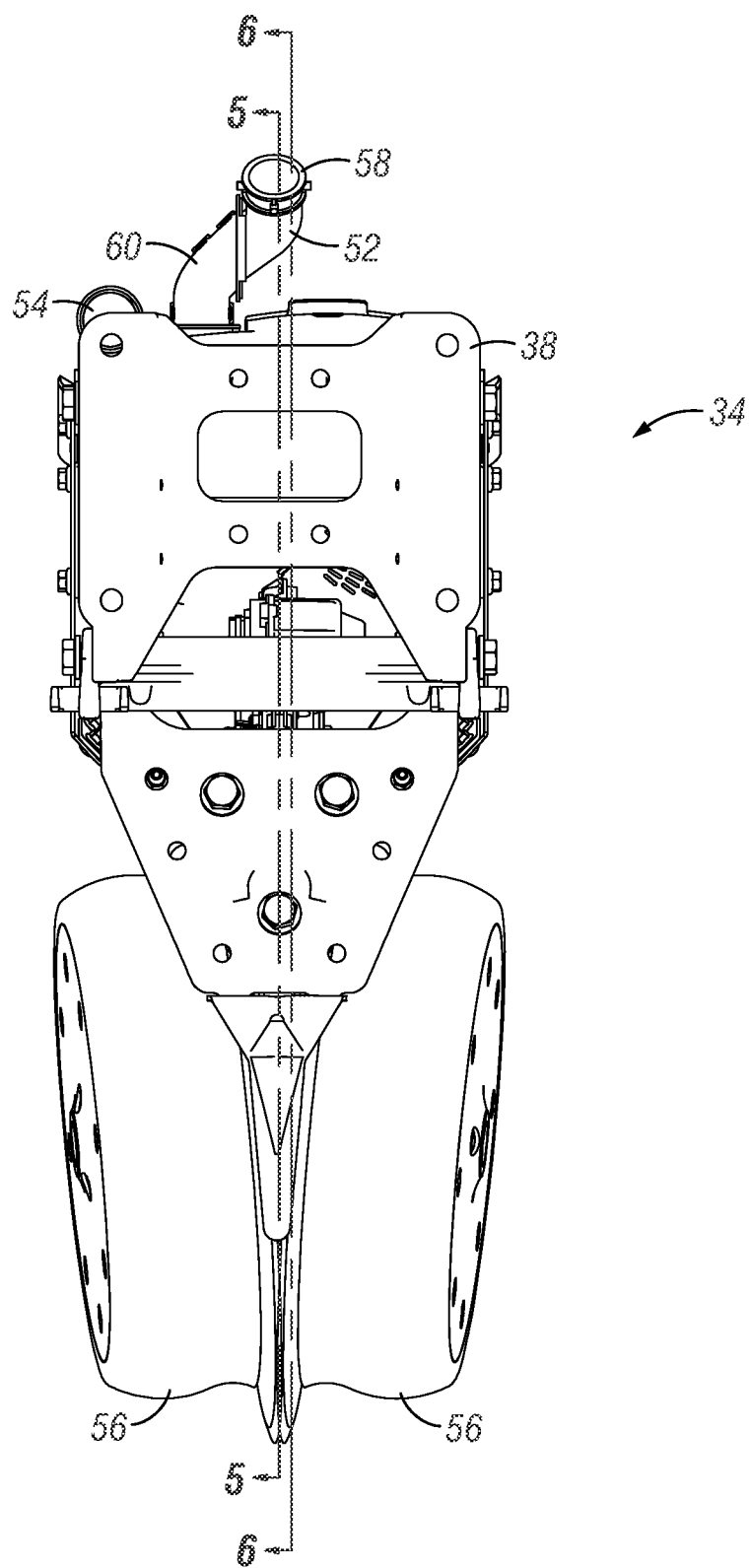
FIG. 4 is a front elevation view of a row unit according to the present disclosure.

FIG. 4 is a front elevation view of a row unit 34 that includes the gauge wheels 56. As seen in FIG. 4, the seed tube 52 includes an upper portion 58 that is pivotally connected to a lower portion 60. As is discussed in more detail below, this feature permits the upper portion 58 to remain connected to the seed supply conduit when the seeder unit cover 46 is rotated to an open position.

Figure 5:
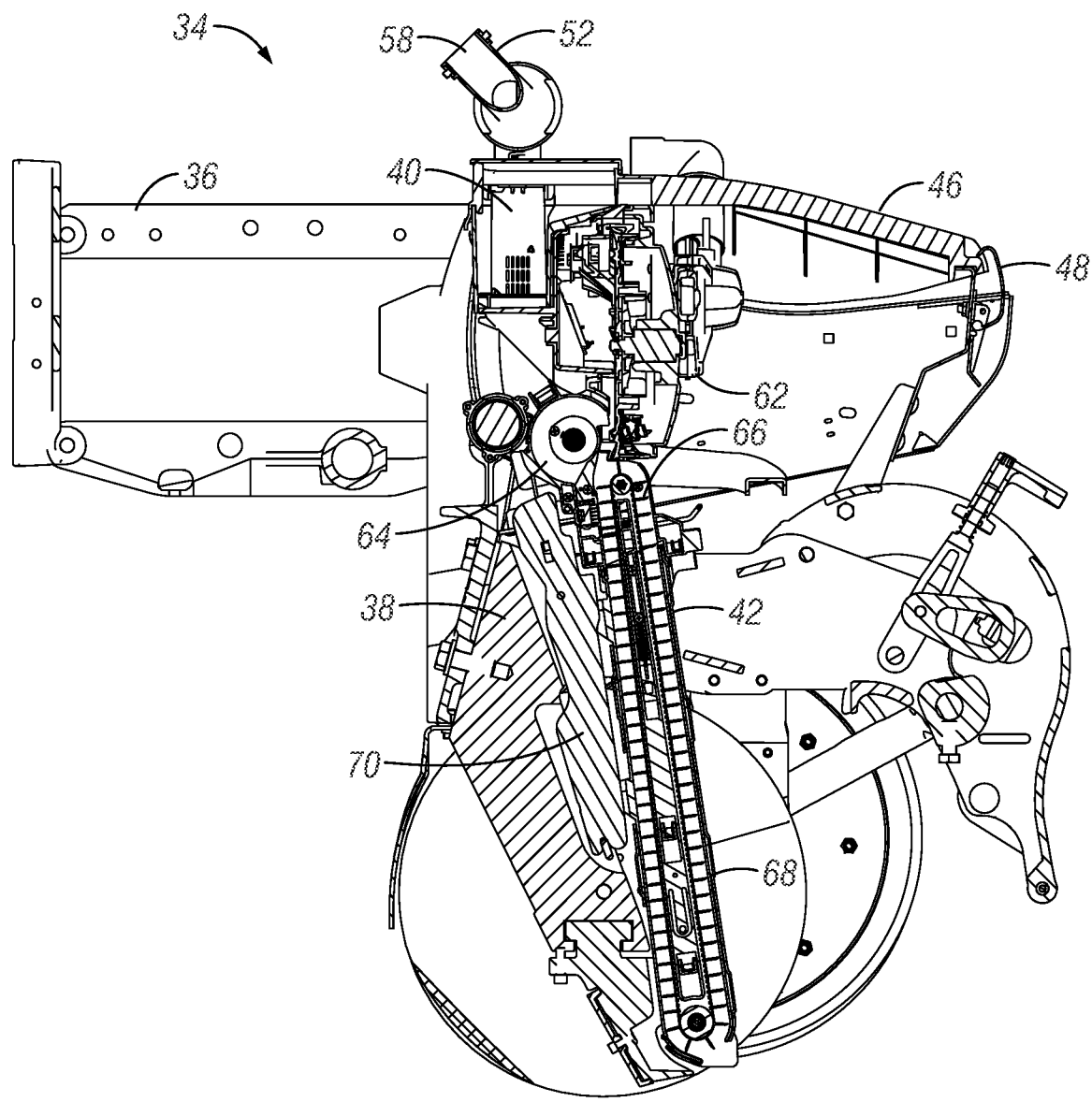
FIG. 5 is a cross-sectional view taken along line A-A of the row unit of FIG. 4.
Figure 6:
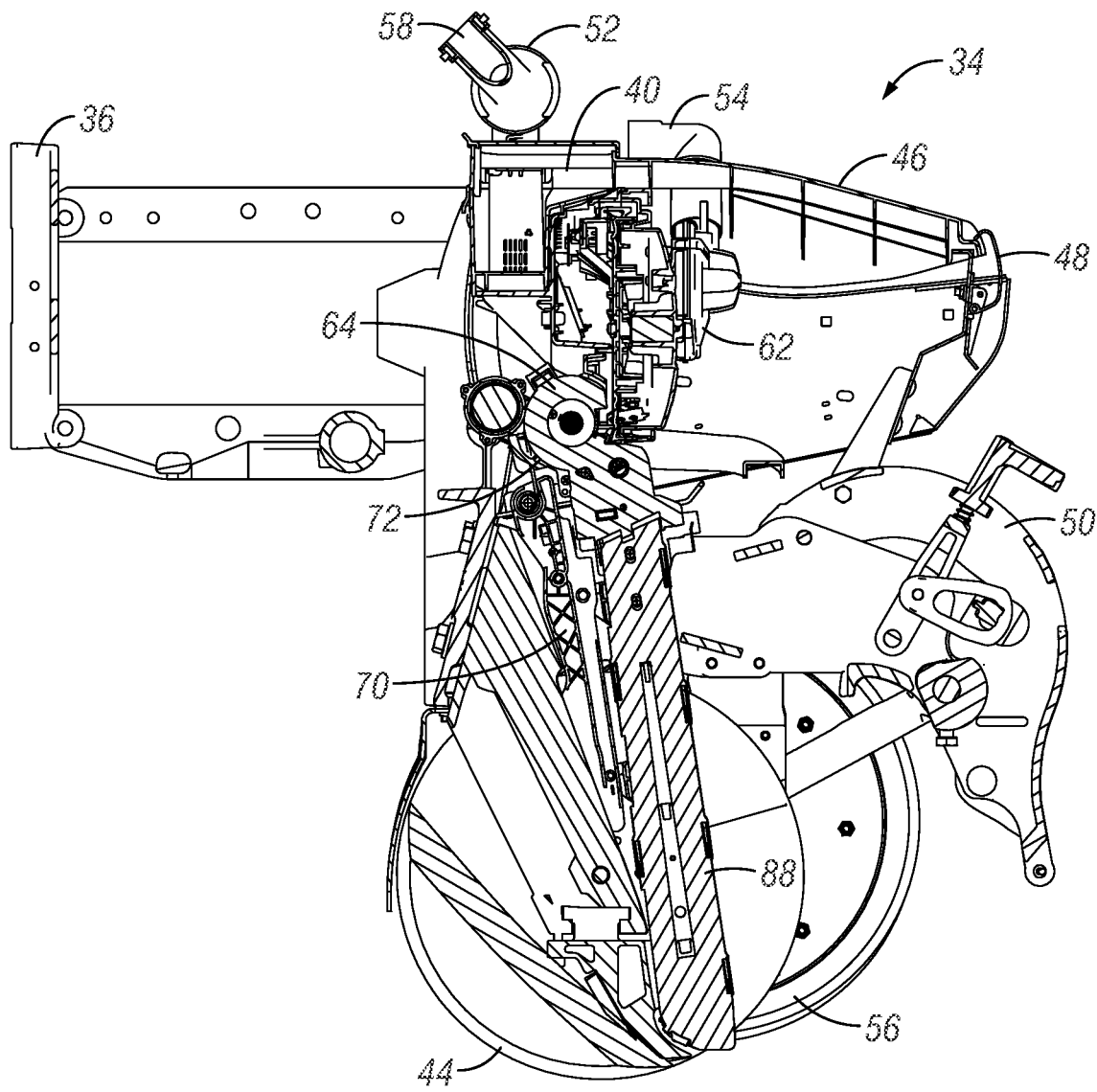
FIG. 6 is a cross-sectional view taken along line B-B of the row unit of FIG. 4.

FIGS. 5 and 6 show cross-section views of the row unit 34 taken along lines A-A and B-B respectively of FIG. 4. The seeder unit 40 can be seen mounted to the row unit frame 38. The seeder unit 42 includes seed meter 62 that provides seeds to seed delivery device 42. The particular seed delivery device 42 shown in the drawings uses a wheel brush 64 to move seeds from the meter 62 to a flighted belt 66 in a seed delivery tube 68. The flighted belt 66 then delivers the seed to the furrow at the bottom of the seed delivery tube 68, preferably with a relative velocity that matches the ground speed to eliminate seed migration within the furrow. It is intended that the present invention is suitable for use with a wide variety of seed delivery devices. The seed delivery device 42 is mounted on a mounting device 70. As described herein the mounting member 70 has a rail portion that is slidingly engaged by the seed delivery device 42 to guide the seed delivery device 42 into the operable position shown in FIGS. 5 and 6. This sliding feature permits convenient installation and removal of the seed delivery device 42 to and from the row unit 34. The mounting device 70 also includes a biasing member, such as a spring 72 that presses against the seed delivery device 42 to urge it into contact with the seed meter 62.

Figure 7:
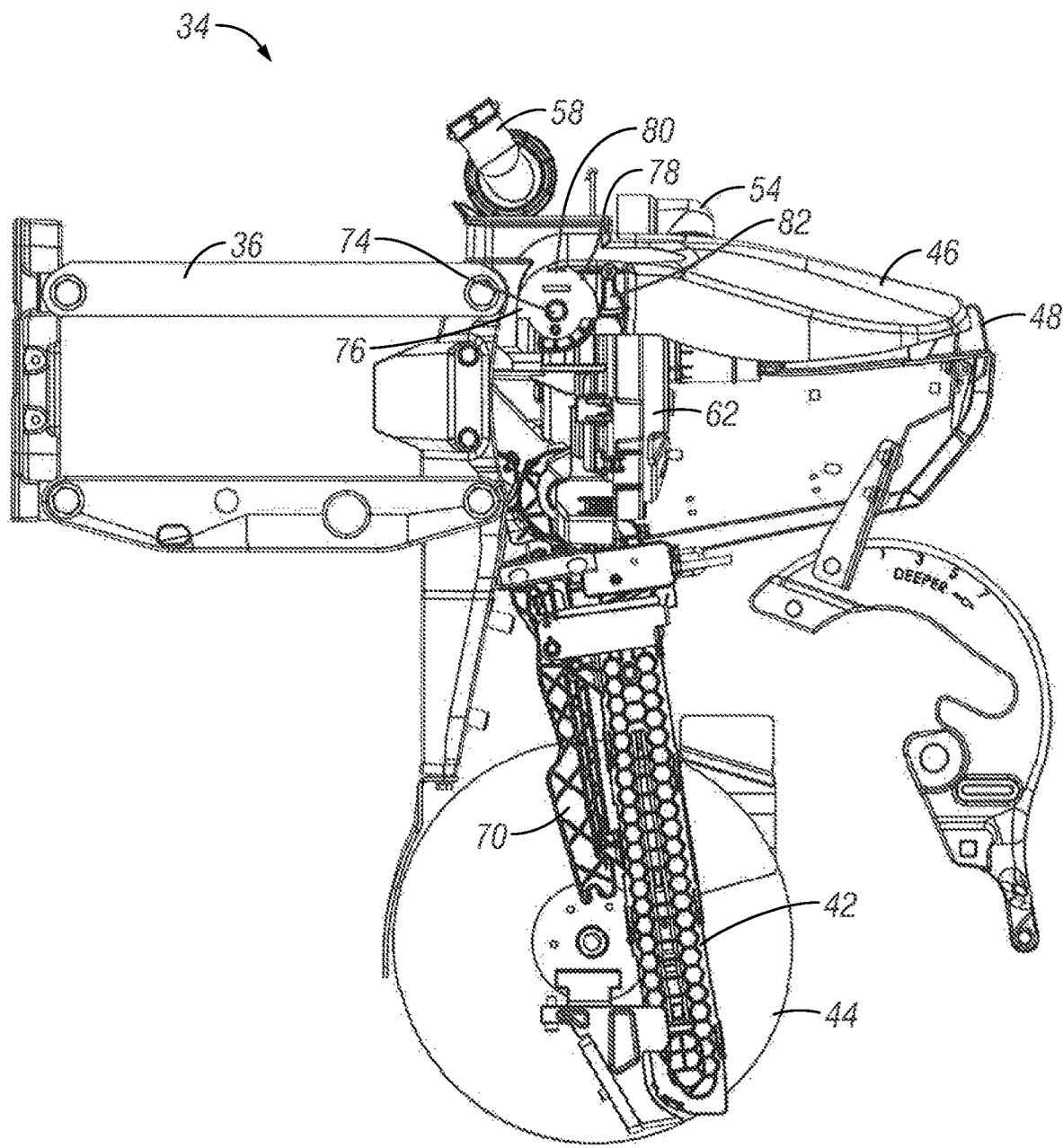
FIG. 7 is a side elevation view of the row unit of FIG. 2 with a portion of the frame and the disk removed for clarity.
Figure 8:
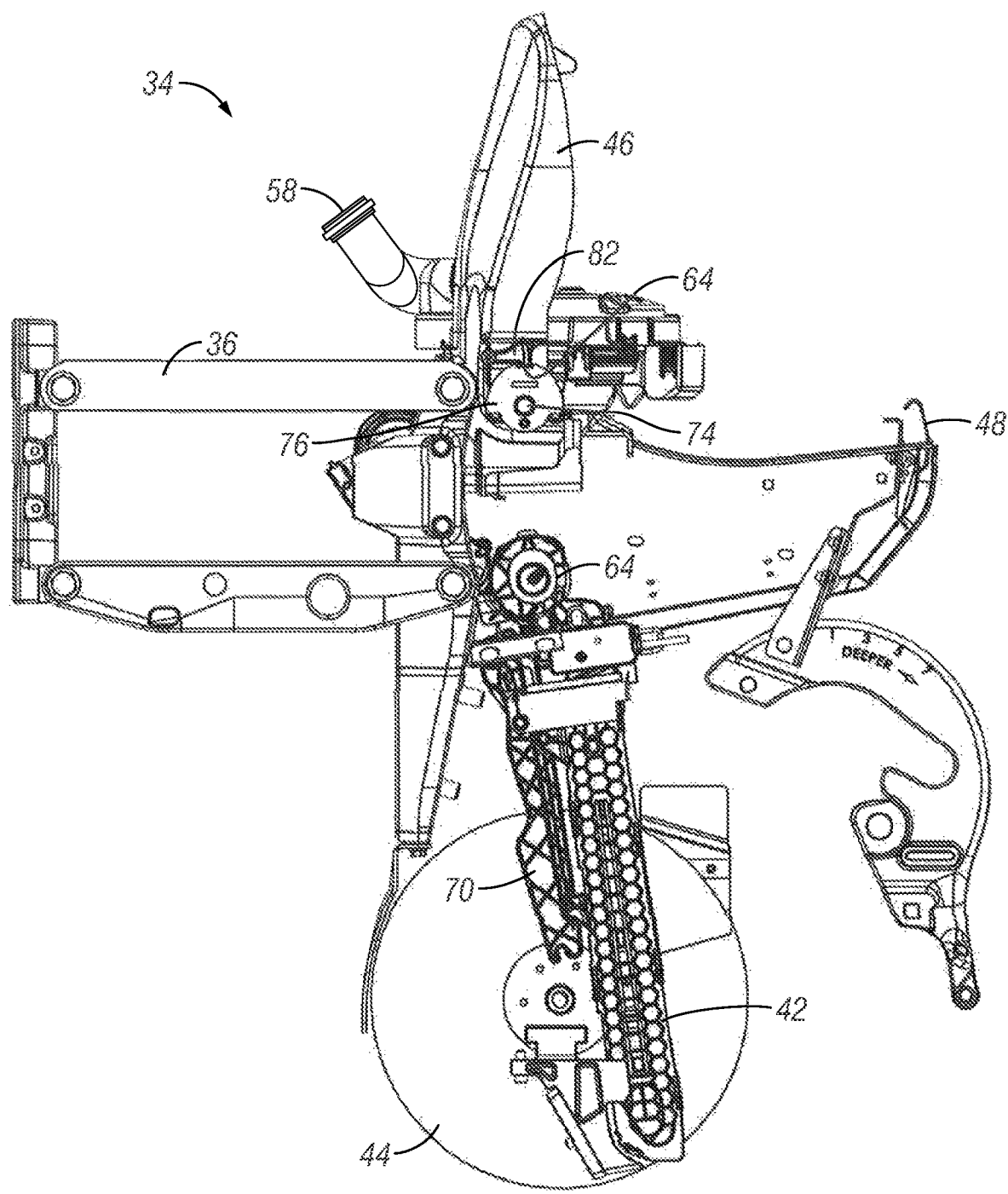
FIG. 8 shows the row unit of FIG. 7 with the cover adjusted to an open position.

FIG. 7 is a side elevation view of the row unit 34 of FIGS. 2 & 3 with a portion of the frame 38 removed to show the components of the seeder unit 40. The cover 46 is in a closed position in FIG. 7. In FIG. 8 the cover has been adjusted to an open position to provide access to the inner workings of the seeder unit 40, including the seed meter 62 and the seed delivery device 42. In order to move from the operational configuration of FIG. 7 to the open configuration of FIG. 8, the latch 48 is released and the cover 46 is manually rotated about pivot members 74 secured to the frame 38 on each side of the cover 46. Also mounted to frame 38 at the pivot members 74 are cam members 76 that include a cam surface 78 and an indentation 80. One or both sides of the cover 46 has a pivotally mounted pawl 82 that rides along the cam surface as the cover 46 is rotated and then drops into the indentation 80 once the cover reaches the vertical position of FIG. 8, to retain the cover 46 in the raised open position. To return to the closed position of FIG. 7, a user manually moves the pawl 82 out of the indentation 80 and rotates the cover 46 back to the closed position.

According to one of the features of the invention, the seed meter 62 may be secured to the underside of the cover 46, such that when the cover 46 is opened, as shown in FIG. 8, the seed meter 62 also rotates up an away from the seed delivery device 42. This permits convenient access to both the seed meter 62 and the seed delivery device 42. A variety of mounting mechanisms for securing the meter 62 to the cover 46 are contemplated, such as resilient tabs and catches or more positive connectors such as screws or bolts. In order to facilitate the movement between the closed and open positions the upper portion 58 of the seed tube 52 is rotatable relative the lower portion 60. This permits the upper portion 58 to remain connected to a supply tube (not shown) as the cover 46 rotates between the open and closed positions without having to go through the cumbersome process of disconnecting and reconnecting the seed tube 52 and the supply tube.

Figure 9:
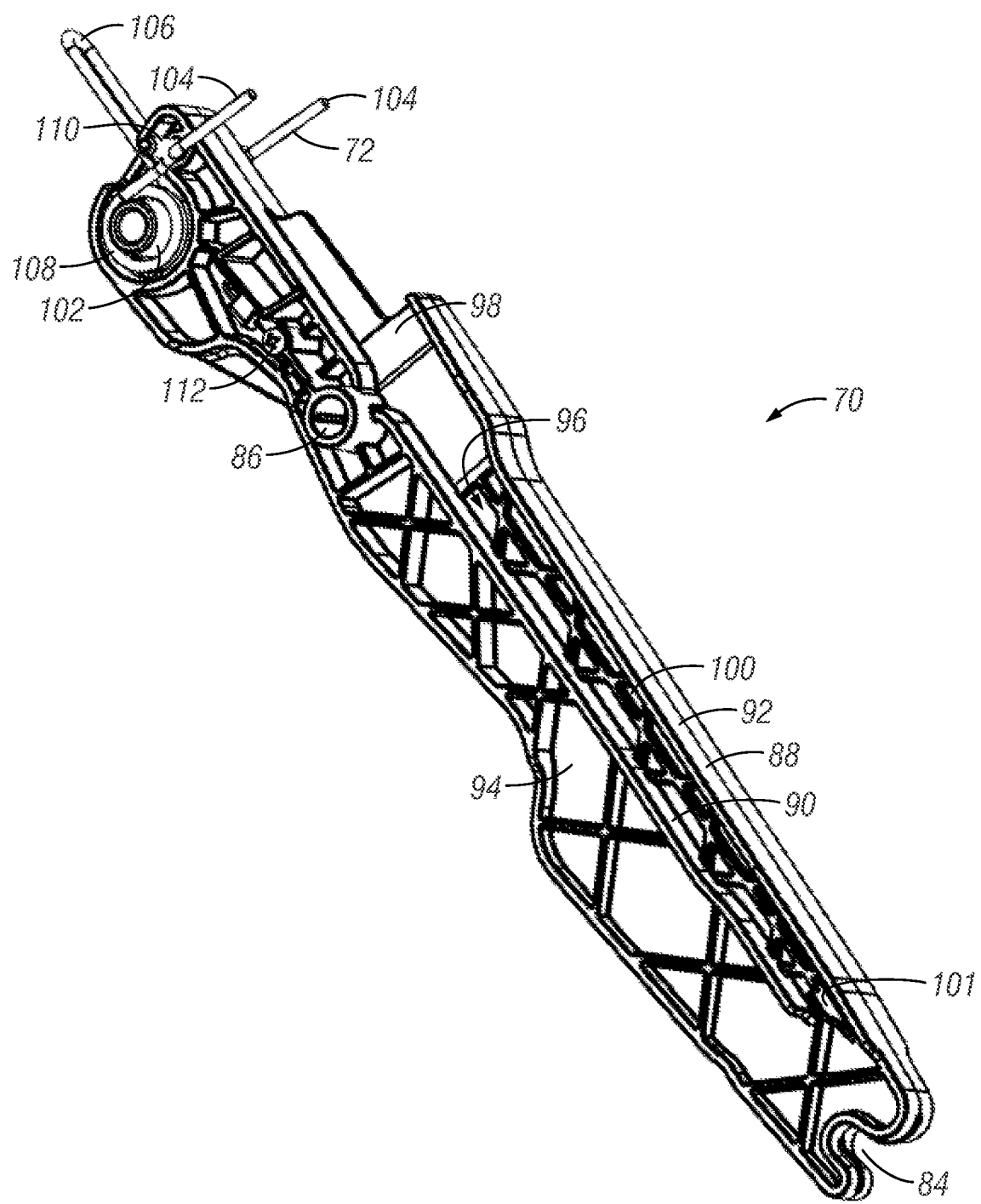
FIG. 9 is an isometric view of a mounting device according to the present disclosure.

FIG. 9 shows the mounting device 70 in detail. The mounting device 70 according to the embodiment shown is an integrally formed one-piece body 94. The mounting device 70 includes a notch 84 that that is adapted to engage the frame 38 to retain the end of the mounting device 70. The mounting device 70 also includes a passage 86 suitable for receiving a fastener, such as bolt, to further secure the mounting device 70 to the frame 38. The mounting device 70 includes a rail portion 88. The rail portion 88 includes an inner flange 90 and an outer flange 92. The outer flange 92 forms a T-shaped cross section with the main body 94 of the device 70. The inner flange 90 also includes a portion on each side of the main body 94. Accordingly, the spaces between the inner flange 90 and outer flange 92 form two pockets 96, one on each side of the main body 94. The pockets 96 are relatively wide at the entrance portion 98 and taper to a narrower lower portion 100. At the lowest portion of the pocket 96 a stop 101 is provided that extends into the lower portion 100 of the pocket 96. Spring retaining spindles 102 are formed at an upper end of the mounting device 70 to retain the torsion spring 72. The spring 72 includes legs 104, a hoop 106, and coils 108. The coils 108 wrap around their respective spindles 102. Alternatively, two springs could be used. Restraining pegs 110 extend transversely from each side of the mounting device body 94. The legs 104 are restrained by the pegs 110 to maintain the spring 72 under tension. A fastener 112, such as a screw 112 is provided to attach a guide 114 (see FIG. 11).

Figure 10:
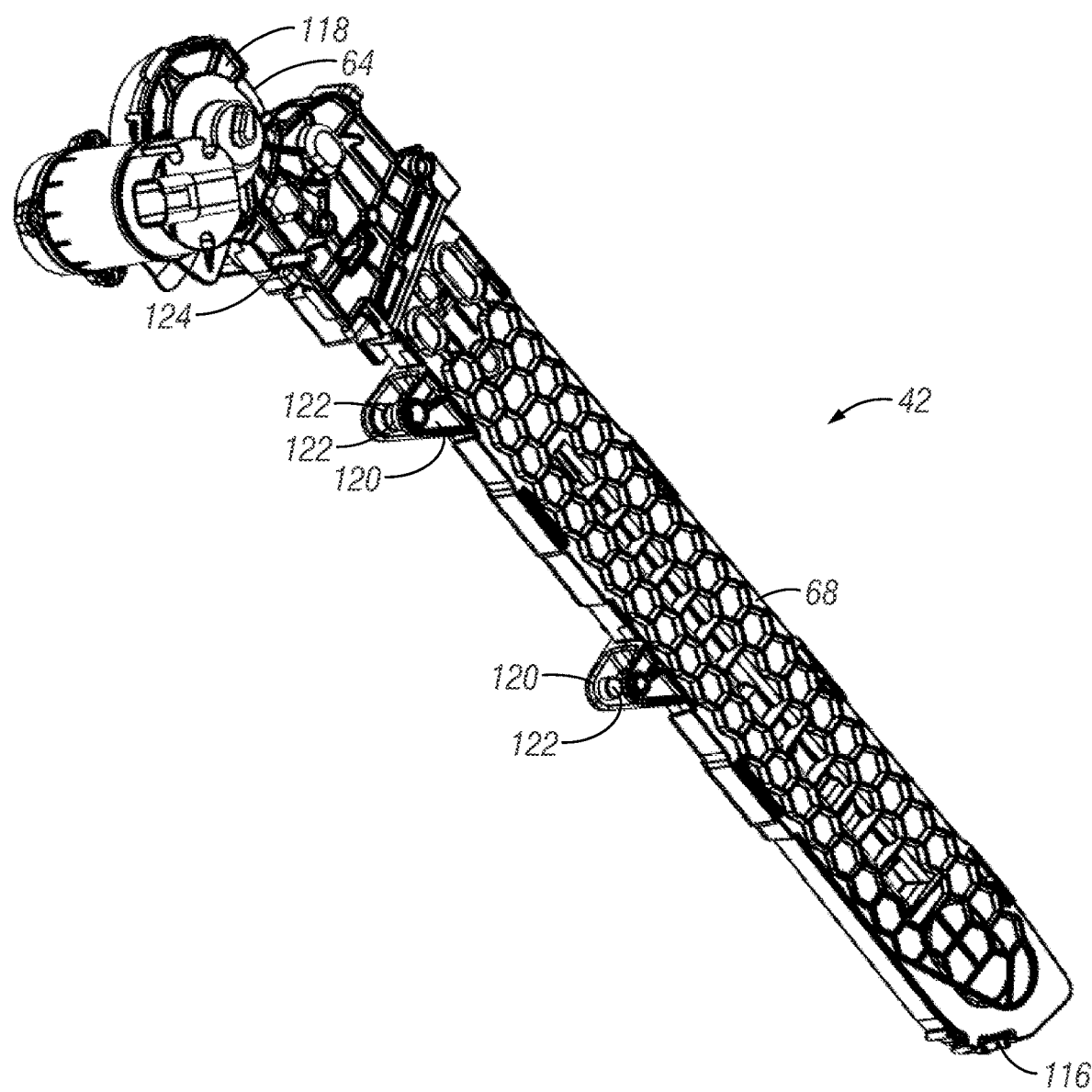
FIG. 10 is an isometric view of a seed delivery device according to the present disclosure.

FIG. 10 is a detailed view of a seed delivery device 42. In the embodiment shown, the delivery device 42 includes a wheel brush case 118 where seed is received from a seed meter. Other structures for receiving seed may be used. A seed delivery tube 68 carries the seed from the brush case 118 where it is received to a seed exit 116 at the lower end of the seed delivery tube 68 where the seed is released to a furrow. As noted, the seed delivery tube may house a variety of structures, such as a flighted belt, brush belt or other structures for guiding or propelling the seed to the exit 116. The delivery device is equipped with U-shaped brackets 120. Each leg of the brackets 120 includes a protrusion 122 on their inner faces. As will be described (see FIGS. 11-17 and accompanying description), the protrusions are adapted to be slidingly received in the pockets 96 of the rail portion 88 of the mounting device 70. Each side of the body 94 also includes a transversely extending peg 124 at its upper end. As shown in FIG. 14, the peg 124 interacts with a leg 104 of the spring 72 when the seed delivery device 42 is installed on the mounting device 70.

Figure 11:
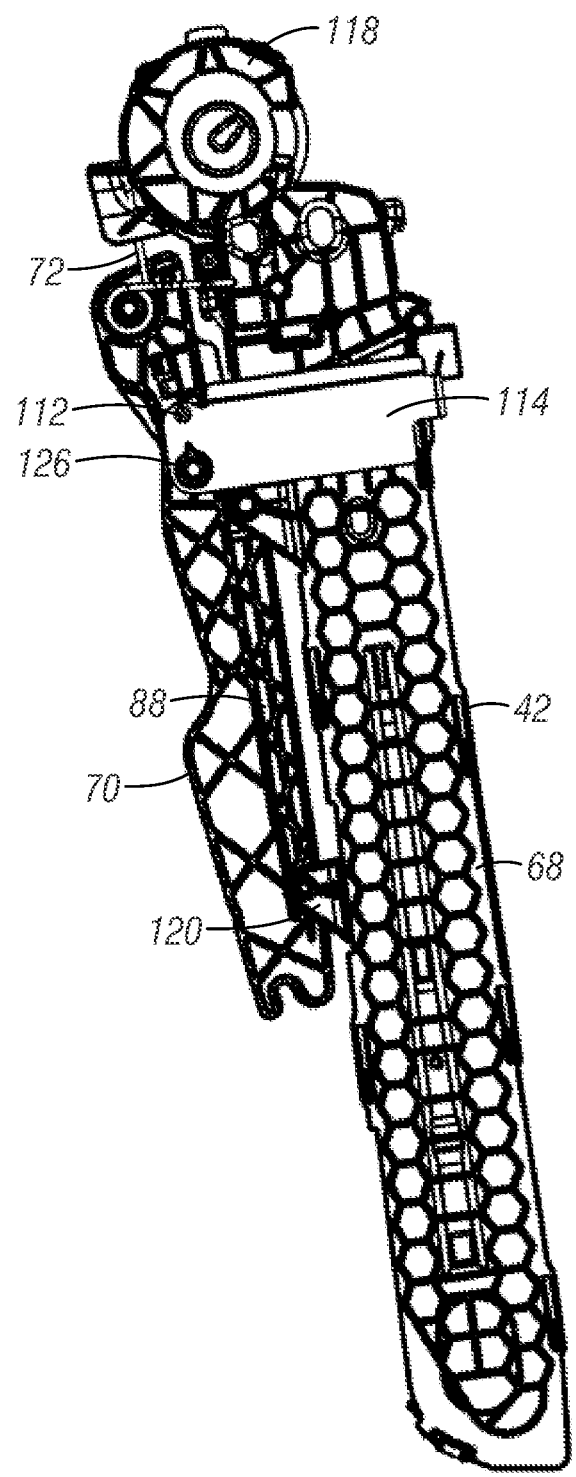
FIG. 11 is a side elevation view of the seed delivery device of FIG. 10 mounted on the mounting device of FIG. 9.
Figure 12:
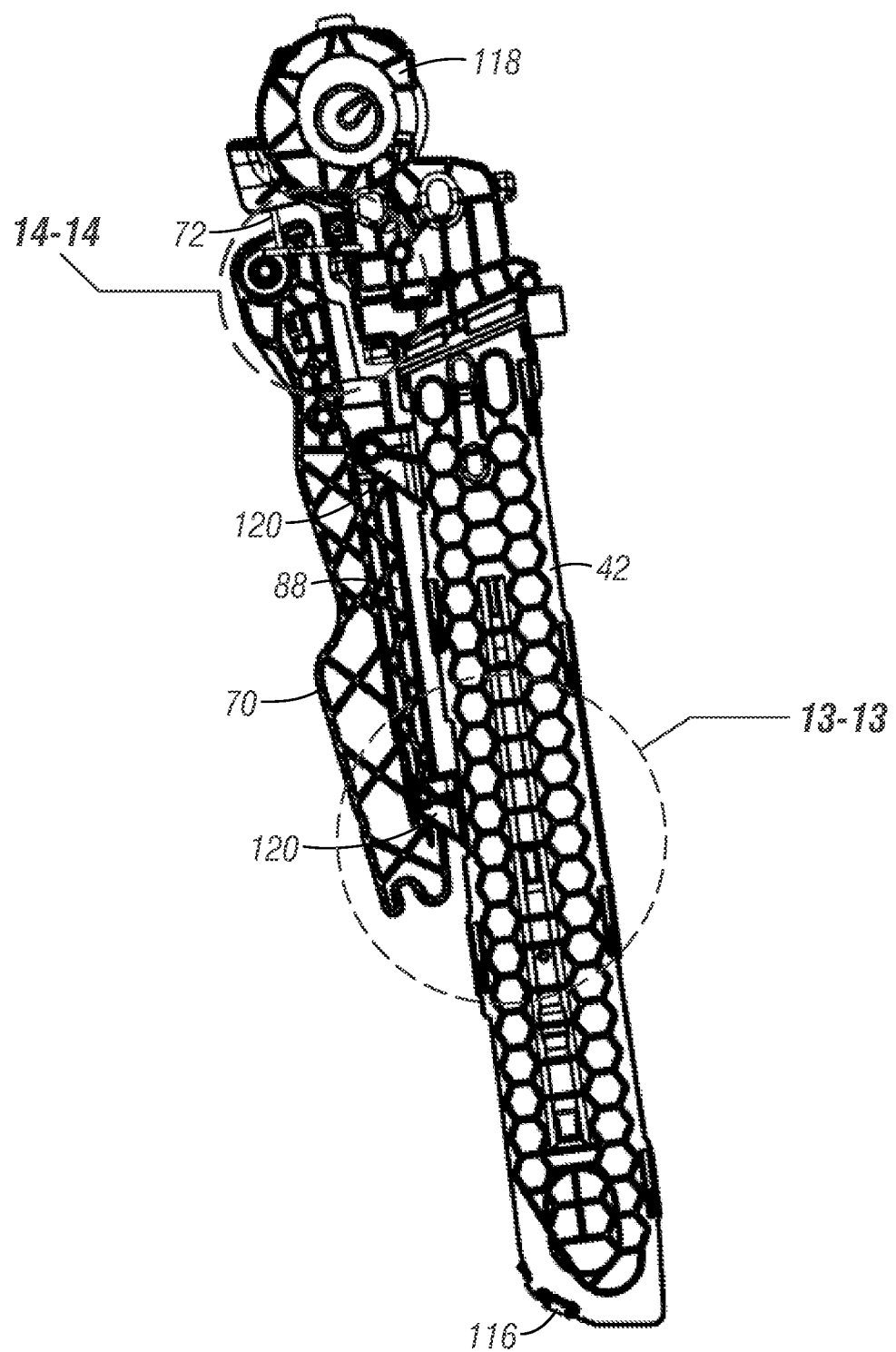
FIG. 12 shows the seed delivery device and mounting device of FIG. 11 with the guide removed for clarity.

FIG. 11 shows the seed delivery device 42 mounted on the mounting device 70 in a working configuration. A U-shaped guide 114 is secured to the mounting device 70 to help a user properly orient and align the seed delivery device 42 with the mounding device 70 during installation. The guide 114 is secured by the screws 112 and a bushing 126 provided in the passage 86. The protrusions 122 on the brackets 120 are received within the pockets 96 of the rail portion 88. FIG. 12 shows the seed delivery device 42 and mounting device 70 of FIG. 11 with the U-shaped guide 114 removed. It may be desired to include a dust cover (not shown) that attaches to the U-shaped guide 114 and extends over portions of the mount 70 and the seed delivery device 42. This dust cover is helpful in preventing or reducing mud and dust that can get into pockets 96 of the mounting device 70 and into the honeycomb pattern of the seed delivery device 42.

Figure 13:
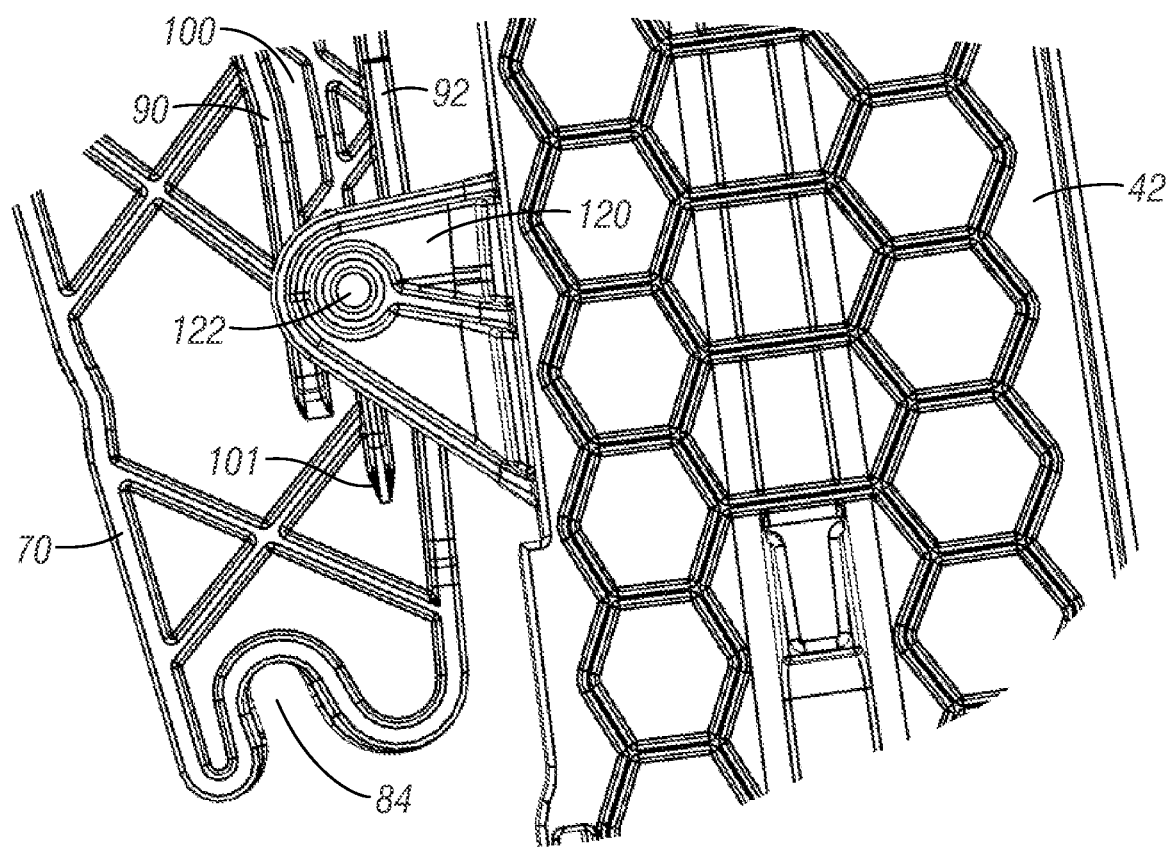
FIG. 13 is an enlarged detail view of the lower portion of the mounting device FIG. 12.
Figure 14:
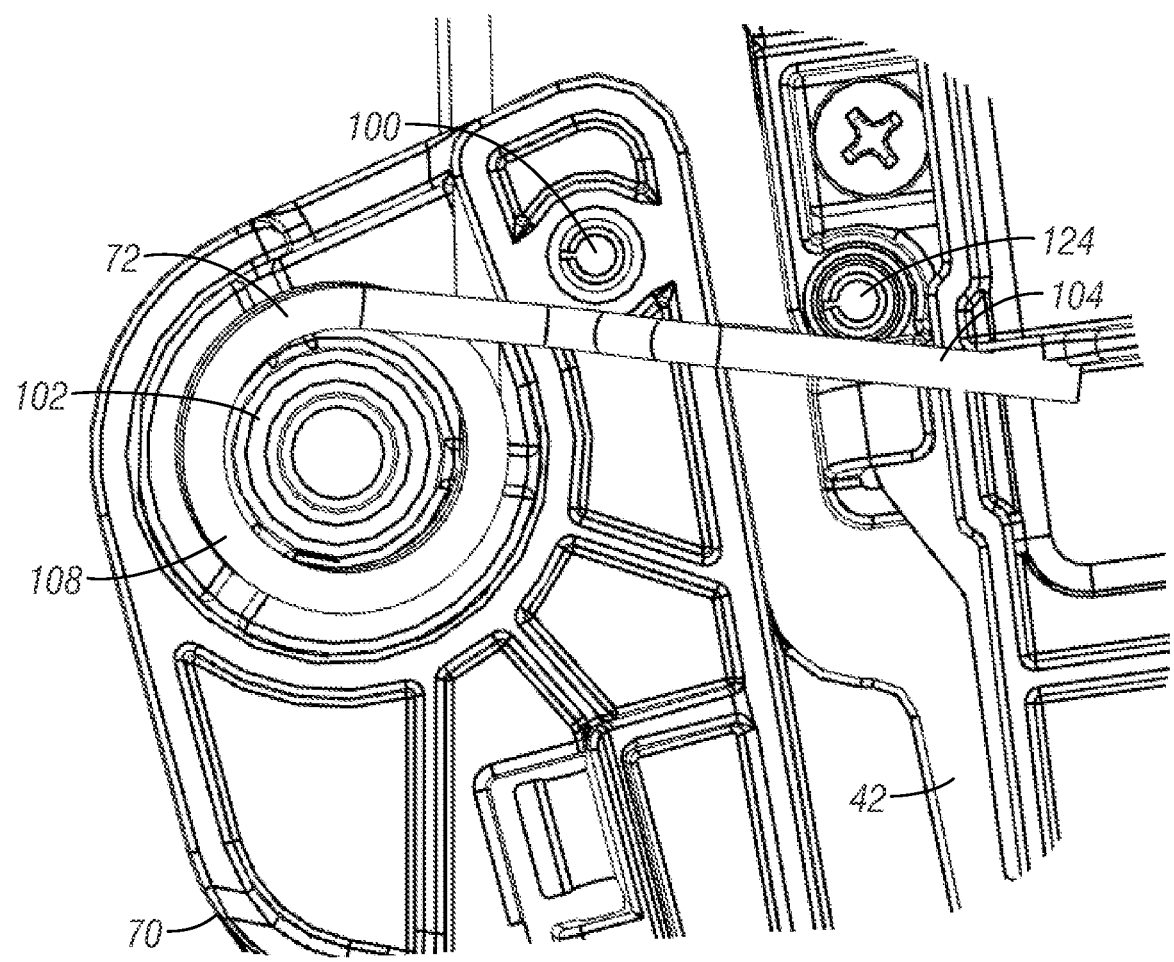
FIG. 14 is an enlarged detail view of the upper portion of the mounting device of FIG. 12.

FIG. 13 is a detailed view of the lower end of the mounting device 70 and seed delivery device 42 of FIG. 12. The lower portion 100 of the pocket 88 is formed between the inner flange 90 and the outer flange 92. As can be appreciated the protrusion 122 of the bracket 120 is in the lower portion 100 of the pocket 88. The stop 101 acts as a limit to how far the protrusion 122 can move in the pocket 88.

FIG. 14 is a detailed view of the upper end of the mounting device 70 and seed delivery device 42 of FIG. 12. The spring 72 is coiled around spindle 102 on the mounting device 70. The leg 104 of the spring 72 is pressing against the transverse peg 124 of the seed delivery device 42 and flexed away from the retaining peg 110 on the mounting device 70. According, the leg 104 urges the seed delivery device 42 generally upward towards the seed meter 62 (see FIGS. 5-8).

Figure 15:
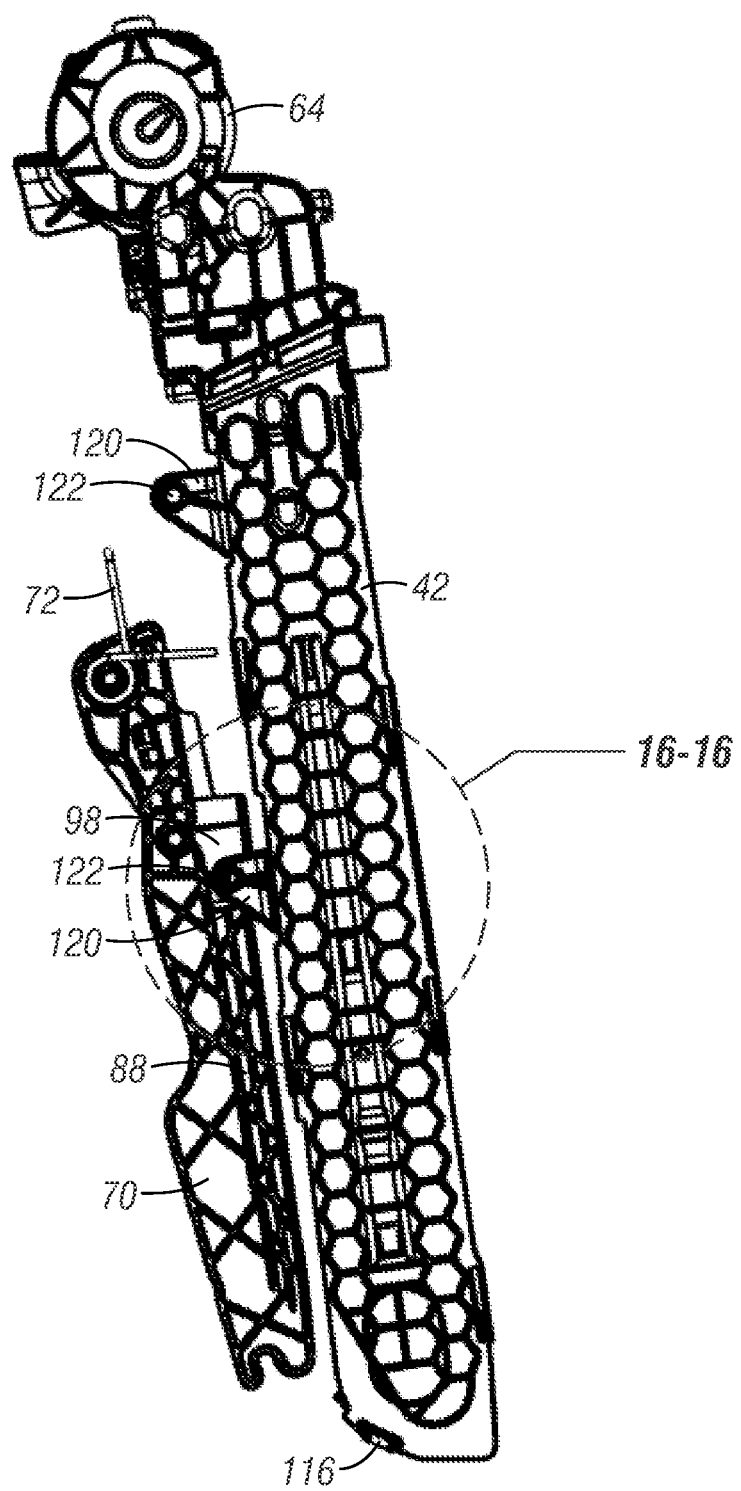
FIG. 15 shows the seed delivery device and mounting device of FIG. 12, with the seed delivery device being inserted to the upper portion of the pocket of the mounting device.
Figure 16:
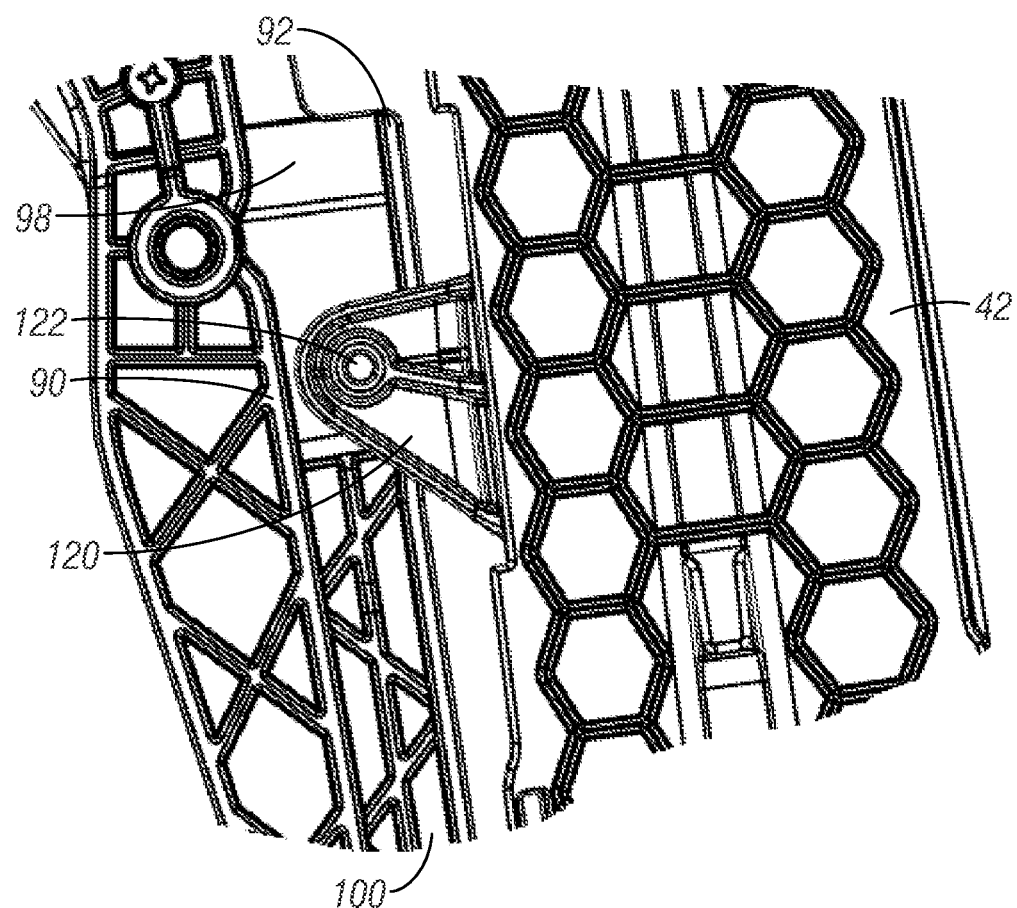
FIG. 16 is an enlarged detail view of the upper portion of the pocket of FIG. 15.

FIG. 15 shows a seed delivery device 42 as it is being installed with the protrusions 122 of the lower bracket 120 being slid into the entrance 98 of the pocket 96. While the guide 114 is not shown in FIG. 15 for clarity, it should be understood that in use the guide 114 will be helpful to a user in guiding the seed delivery device 42 into proper alignment with the mounting device 70 such that the protrusions 122 are aligned to enter the pocket entrance 98. The installation is also aided by the fact that the pocket entrance 98 is relatively wide and then tapers to the narrower passage of the lower portion 100 of the pocket 96. Detail drawing FIG. 16 is an enlargement of the entrance portion 98 of the pocket 96 as the lower protrusion 122 enters. It can be seen that the flanges 90 and 92 are farther apart at the entrance 98 than at the lower portion 100 of the pocket 96.

Figure 17:
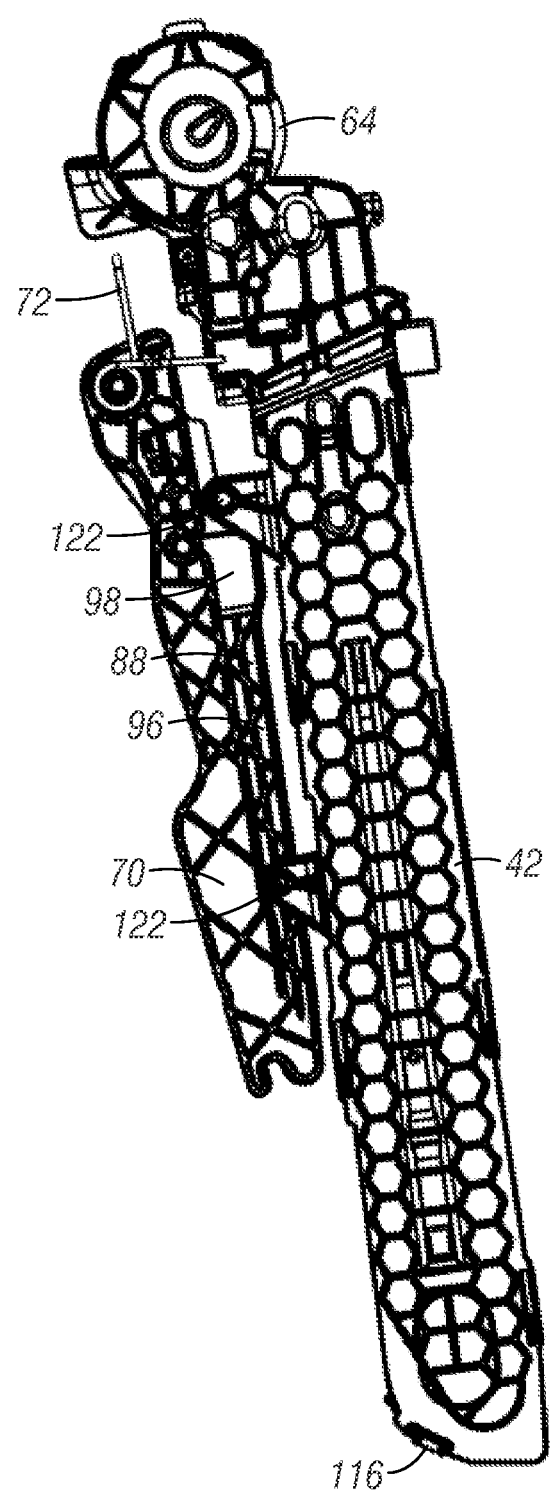
FIG. 17 shows the seed delivery device of FIG. 12 partially slid into engagement with the mounting device of FIG. 12.

FIG. 17 shows a seed delivery device 42 intermediate between the positions of FIGS. 15 and 12 as it is being installed on the mounting device 70. The lower protrusion 122 is nearing the bottom of the pocket 96. The upper protrusion 122 is being funneled into the pocket 96 by the wide entrance 98. It can also be seen in FIG. 17 that the loop 106 of the spring 72 is in line to bear against a side portion of the case 118 for the wheel brush 64 to urge the upper portion of the seed delivery device 42 generally to the right (as shown in FIG. 17) toward the seed meter 62 (see FIGS. 5-8).

In use the features described herein permit quick installation of a seed delivery device by using a mounting device that includes a rail portion that guides the seed delivery device into an operable position and retains it in place and permits removal of the seed delivery device without the need for tools. Furthermore, the features permit simple and convenient access to the seed meter and seed delivery device by providing a system that permits adjusting the seed meter away from the seed delivery device by rotating a cover to an open position.

Thus, various configurations of seed delivery systems have been shown and described. It should be appreciated that the systems shown and described are for exemplary purposes, and the invention of a controlled system for delivering seed from a singulating seed meter to the ground to provide for consistent and equidistant spacing of the seed in the ground has thus been provided. It is to be contemplated that numerous variations, changes, and otherwise, which are obvious to those skilled in the art are to be considered part of the present invention. For example, while the embodiment shown shows the rail portion as being generally female to receive a male protrusion on the seed delivery device, that arrangement could be reversed.

The invention claimed is:

1. A row unit for use with an agricultural implement, comprising:
    a frame;
    a mounting device attached to the frame, the mounting device comprising a rail portion, the rail portion including an outer flange with an outer surface, and an inner surface of the outer flange opposite the outer surface;
    a seed delivery device adapted to slidingly engage the outer surface and the inner surface of the outer flange such that the rail portion guides the seed delivery device into an operable position.

2. The row unit of claim 1, further comprising a spring in contact with the mounting device and the seed delivery device to urge the seed delivery device towards a seed meter.

3. The row unit of claim 2, wherein the spring is a torsion spring secured to the mounting device.

4. The row unit of claim 3, wherein the spring comprises a leg and further wherein the seed delivery device comprises a peg that contacts the leg to thereby be urged towards the seed meter.

5. The row unit of claim 4, wherein the spring comprises a loop that contacts a portion of the seed delivery device to urge the seed delivery device towards the seed meter.

6. The row unit of claim 1, wherein the rail portion comprises a pocket.

7. The row unit of claim 6, wherein the pocket is formed by the outer flange and an inner flange.

8. The row unit of claim 7, wherein the pocket is wider at a receiving end than at an end opposite the receiving end to funnel a protrusion on the seed delivery device between the outer flange and the inner flange.

9. The row unit of claim 1, further comprising a cover rotatably mounted to the frame, the cover being adjustable between a closed position wherein the cover is generally covering the seed delivery device and an open position wherein the cover is partially withdrawn to expose the seed delivery device, and further wherein a seed meter is secured to an underside of the cover such that when the cover is moved to the open position, the seed meter is withdrawn from the seed delivery device to provide access to both the seed delivery device and the seed meter.

10. The row unit of claim 9, further comprising a seed tube that extends through the cover to provide seed from a remote hopper to the seed meter, the seed tube including an upper portion that is pivotally mounted relative to a lower portion of the seed tube such that as the cover is rotated between the closed and open positions that seed tube does not need to be disconnected from a supply tube.

11. A mounting device for use in mounting a seed delivery device to an agricultural row unit, the mounting device comprising:
    an elongated body adapted for securement to the row unit;
    a rail portion on the elongated body with an outer flange comprising an outer surface and an inner surface opposite the outer surface adapted for sliding engagement with the seed delivery device to guide the seed delivery device into an operable position, wherein the seed delivery device engages the outer surface and the inner surface of the outer flange simultaneously.

12. The mounting device of claim 11, wherein the rail portion comprises a pocket formed by the outer flange aligned with an inner flange on the elongated body.

13. The mounting device of claim 12 wherein the pocket is wider at an entrance to funnel a protrusion into the pocket.

14. The mounting device of claim 11, wherein the rail portion comprises two pockets formed on opposite sides of the elongated body by a pair of transverse flanges.

15. The mounting device of claim 11, wherein the elongated body comprises an open notch at a lower end for receiving a frame member on the row unit.

16. The mounting device of claim 11, further comprising a U-shaped guide secured to the elongated body to guide the seed delivery device into alignment with the mounting device such that a protrusion on the seed delivery device is received by the rail portion.

17. The mounting device of claim 11, further comprising a spring adapted to urge the seed delivery device towards a seed meter.

18. The mounting device of claim 17 wherein the spring is a torsion spring and the mounting device further comprises a spindle around which the torsion spring is provided.

\* \* \* \* \*